United States Patent [19]
Duncanson et al.

[11] 3,800,909
[45] Apr. 2, 1974

[54] NOISE-SUPPRESSING CONTROL LEVER FOR VIBRATION PRONE MECHANISMS

[75] Inventors: William T. Duncanson, Pekin; James C. Kennedy, Jr., Washington, both of Ill.

[73] Assignee: Caterpillar Tractor Co., Peoria, Ill.

[22] Filed: July 17, 1972

[21] Appl. No.: 272,406

[52] U.S. Cl. .............. 181/33 A, 16/121, 74/473 P, 74/523, 74/543, 181/33 K
[51] Int. Cl. ............................................. G05g 9/00
[58] Field of Search... 181/33 A, 33 K, 33 M, 33 R; 74/473 R, 473 P, 523, 543; 287/85 R; 16/121, DIG. 30

[56] References Cited
UNITED STATES PATENTS

| | | | |
|---|---|---|---|
| 1,848,892 | 3/1932 | Kollmar | 16/121 X |
| 1,896,893 | 2/1933 | Hartsock | 74/473 P |
| 1,911,322 | 5/1933 | Murray et al | 74/473 P |
| 1,927,646 | 9/1933 | Miller | 74/473 P |
| 2,061,811 | 11/1936 | Sinko | 16/121 UX |
| 2,107,204 | 2/1938 | Macksey | 16/121 |
| 2,199,018 | 4/1940 | Bahr | 16/121 |
| 2,272,897 | 2/1942 | Riesing | 74/523 |
| 3,484,808 | 12/1969 | Conterno | 16/121 X |
| 3,561,281 | 2/1971 | Wilfert | 74/523 X |
| 3,693,467 | 9/1972 | Oehl | 74/473 R |
| 3,732,746 | 5/1973 | Fitzpatrick | 74/523 X |

FOREIGN PATENTS OR APPLICATIONS

| | | | |
|---|---|---|---|
| 1,909,551 | 9/1970 | Germany | 74/473 R |

Primary Examiner—Stephen J. Tomsky
Assistant Examiner—John F. Gonzales
Attorney, Agent, or Firm—Fryer, Tjensvold, Phillips & Lempio

[57] ABSTRACT

A manually shiftable lever having a free end for manipulation by an operator and an opposite end extending through an opening in a housing where noise may originate includes a sleeve mounted coaxially on the lever by axially spaced resilient rings, and a resilient cover connecting the sleeve to a collar mounted on the housing so that the lever is effectively enclosed by vibration dampening means to minimize the transmission of noise through the lever itself as well as suppressing the passage of airborne noise through the lever opening in the housing.

7 Claims, 5 Drawing Figures

NOISE-SUPPRESSING CONTROL LEVER FOR VIBRATION PRONE MECHANISMS

BACKGROUND OF THE INVENTION

This invention relates to control levers for powered mechanisms such as vehicles and the like and more particularly to means for suppressing the release of acoustical energy through control levers and associated structure.

Recent studies on the sources of noise in vehicle cabs have indicated that control levers, such as transmission drive ratio selector levers, often transmit a large volume of sound into the operator's environmental area. While cabs are frequently lined with accoustical insulating material, one small opening for airborne sound or only a single noise-emitting member can largely defeat the efforts to soundproof the cab. Heretofore, it has been customary to provide a resilient boot between control levers and the supporting housing to close the opening through which the lever passes. In many instances this has not been fully successful because vibrations in the audible range are still transmitted through metal-to-metal contact from the controlled mechanism to the lever and are radiated from the operator manipulated end of the lever. The problem is aggravated if the levers have a length and mass establishing a natural vibrational frequency similar to the source noises and thus vibrate in resonance with the exciting energy source. The resilient boots heretofore placed around the lower end of such levers have insufficient damping qualities to minimize the vibrational tendencies of many of these "problem" levers.

SUMMARY AND OBJECTS OF THE INVENTION

This invention is a manually manipulatable operator's control lever construction for mechanisms which are prone to produce unwanted noise and wherein such noise may tend to be transmitted through the control lever and through openings provided for the control lever. Release of acoustical energy is suppressed by enclosing at least a major portion of the operator's end of the control lever in a sleeve of greater diameter with resilient support rings being disposed between the sleeve and lever. Preferably the sleeve connects directly with a resilient boot which closes the lever opening to block airborne noise thereat.

Accordingly it is an object of this invention to reduce noise in the operator's area of vibration prone mechanism.

It is another object of the present invention to provide an operator's control lever for vehicles or other vibration prone mechanism which more effectively suppresses noise transmission through the lever and associated structure.

Other objects and advantages of the present invention will become more readily apparent upon reference to the accompanying drawings and following description.

BRIEF DESCRIPTION OF THE DRAWINGS

FIG. 3 is an exploded axial section view of the upper end of the noise-suppressing lever of FIG. 1.

DESCRIPTION OF PREFERRED EMBODIMENTS

Figure 1:
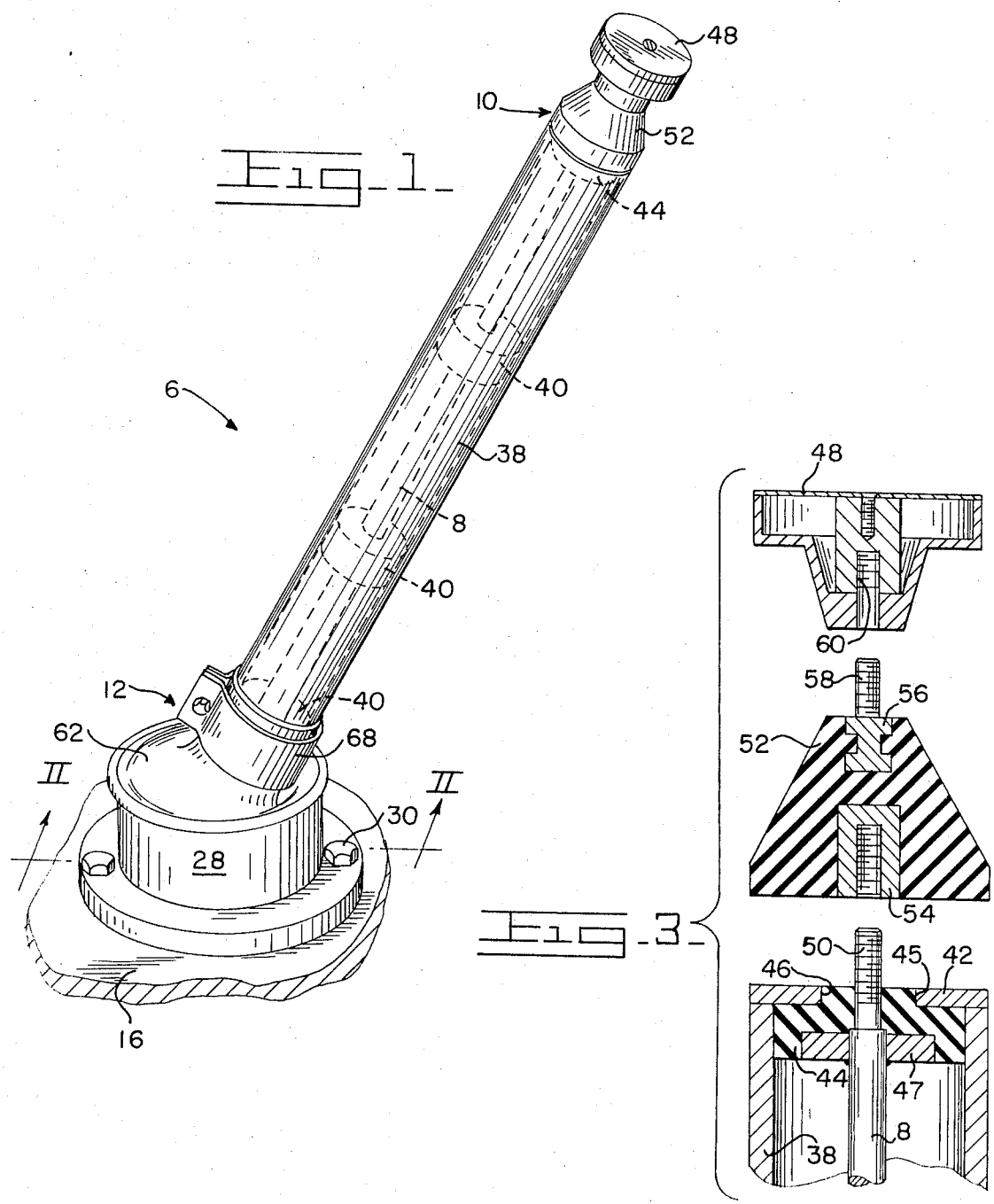
FIG. 1 is a perspective view of a noise-suppressing lever embodying the present invention.
Figure 2:
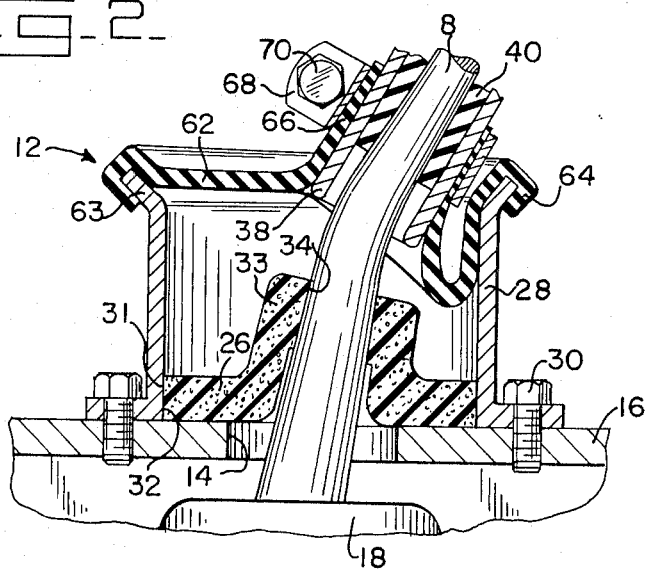
FIG. 2 is a vertical section view of the lower end of the noise-suppressing lever taken along line II—II of FIG. 1.

Referring now to the drawings, and more particularly to FIGS. 1 and 2 in conjunction, there is illustrated a noise-suppressing selector lever assembly 6 which in this instance is the drive ratio selector or "gear shift" member controlling a vehicle transmission. Lever assembly 6 has a slightly tapered control lever 8 which extends downwardly from an operator manipulated end 10 to an opposite or lower end 12 and through an opening 14 in a housing 16 and connects with transmission shifting structure 18 which may be of conventional design. The control lever 8 is positionable in predetermined patterns relative to housing 16 to realize different transmission settings as well understood in the art. A flexible insulating ring 26 of acoustical polyurethane foam, heavy sheet rubber or the like, is disposed between the lever 8 and opening 14 to suppress passage of airborne noise through the opening. A cylindrical collar 28 is also disposed above the opening and is secured to the housing 16 by a plurality of bolts 30. The outer cylindrical surface 31 of the insulating ring 26 abuts the inner cylindrical surface 32 of the collar 28, and the insulating ring further has an integral upwardly extending tubular inner portion 33 with an internal opening 34 through which the lever 8 passes. In other instances where a sheet rubber element is used the edge thereof may serve as a gasket by extending outwardly intermediate the flange of the collar and the housing.

The noise-suppressing selector lever assembly 6 further includes an elongated sleeve or cylindrical casing 38 of high mass or high density material such as lead or steel which generally encircles the control lever 8 in spaced relation therefrom. This sleeve 38 is held in place on the lever 8 by a plurality of axially spaced resilient rings 40 of rubber or other elastomeric material. As best shown in the exploded view of Figure 3, the upper end of the sleeve is provided with an integral annular cap 42 in which is mounted a resilient annular elastomeric member 44 having an upper cylindrical extension 45 that fits within an opening 46 in the cap. A thrust washer 47 is welded or otherwise secured to the lever 8 to retain the upper end of the sleeve thereat.

The operator manipulated end 10 of the lever assembly 6 consists of a grippable knob 48 secured to an upper threaded end 50 of the control lever 8, which projects above member 44, through an intermediate resilient mount 52. This resilient mount 52 is of molded rubber or other elastomeric construction and contains an internally threaded lower insert 54 at the lower face and an upper insert 56 that includes a threaded stud 58 extending above the upper face. The knob 48 is provided with an internally threaded bore 60 and is threaded on the stud 58 of the resilient mounted insert 56. The lower insert 54 of the resilient mount is threadably engaged on lever end 50 with the lower face of the mount abutting the cap 42.

Referring again to Figure 2, the lower portion 12 of the lever assembly 6 includes a molded resilient boot 62 mounted on an upper flared peripheral lip 63 of the collar 28 by disposition of the lip in a re-entrant rim 64 of the boot. This boot 62 also has an upwardly-extending tubular portion 66 encircling the lower end of the sleeve 38. A clamping ring 68 operated by a bolt 70 secures the tubular portion 66 of the boot against the sleeve 38.

In operation, it is to be noted that there are generally two distinct ways in which a control lever assembly may release noise into the operator's area. First, there are directly-transmitted vibrations through metal-to-metal contact such as for example between the mechanism 18 and the control lever 8. Second, there are airborne vibrations which would pass outwardly through any opening in the housing 16 unless a suitable closure member is provided. Vibrations transmitted directly through the control lever 8 are effectively suppressed by the above described high density sleeve 38, and resilient rings 40 which jointly have a noise-dampening effect. Vibrations transmitted by the control lever 8 do not couple strongly to the surrounding air nor readily pass upwardly to the operator manipulated end 10 through the resilient rings 40 and the sleeve 38 which act as an acoustical shield and as a dampening means. Still another noise suppressing effect may be operative in those instances where a control lever 8, lacking the present invention, exhibits a natural frequency of vibration which is in resonance with that of the exciting energy source and therefore tends to vibrate very strongly. In such instances, the additional mass provided by the elements of the present invention may shift the natural frequency of the lever away from resonance with the vibration source.

In connection with airborne noise suppression, the present invention provides a dual noise barrier. The insulating ring 26 provides a first such barrier, while the boot 62 and lower resilient ring 40 provide the second barrier. In addition, both the resilient extension 33 of the ring 26 and the upwardly-extending tubular portion 66 of the boot 62 tend to directly dampen direct vibration of control lever 8.

Noise emission from the operator manipulated end of the lever assembly is still further reduced by the resilient mount 52 intermediate the knob 48 and the lever 8. The resilient mount 52 further attenuates direct vibration transmission from the control lever 8 to the knob 48.

Figure 4:
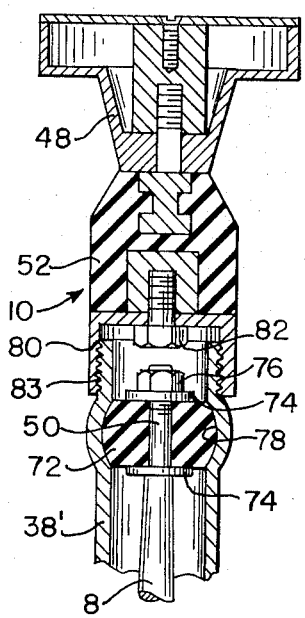
FIG. 4 is an axial section view of the upper end of a second embodiment of a noise-suppressing lever.

FIG. 4 shows a second embodiment of the noise-suppressing selector lever assembly 6 which may be similar to that previously described except for a modified operator-manipulated end 10. In this embodiment a resilient elastomeric ring 72 is disposed on the upper end of the control lever 8 between a pair of rigid washers 74. A nut 76 is threadably engaged on the upper threaded end 50 of the control lever 8 for urging the upper washer 74 downwardly to compressibly load the ring 72. Sleeve 38' in this embodiment is modified to have an annular band portion 78 of arcuate cross section to receive and retain ring 72 which is radially-expanded by turning nut 76. An internally threaded cap 80 is secured to the intermediate resilient mount 52 by a bolt 82, and is threadably engaged on external threads 83 on the upper end of the sleeve 38'.

In the second embodiment of the invention shown in FIG. 4, the upper end of the control lever 8 is more fully isolated from the resilient mount 52 than in the first described embodiment as two vibration-inhibiting barriers 72 and 52 are present between lever 8 and knob 48.

Figure 5:
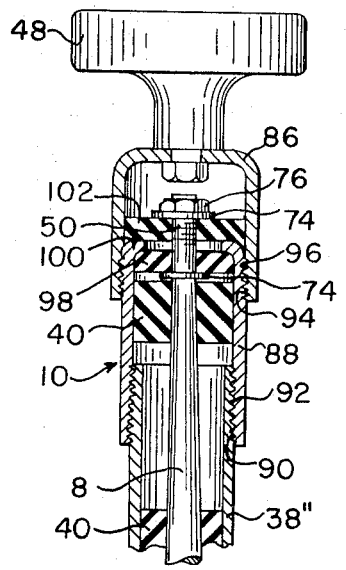
FIG. 5 is an axial section view of the upper end of a third embodiment of a noise-suppressing lever.

Another modification of the operator manipulated end 10 of the lever assembly is shown in FIG. 5 wherein the knob 48 is coupled to the upper end of sleeve 38" through an adapter cup 86 and an intermediate extension tube 88. The extension tube 88 has internal threads 90 on the lower end thereof which threadably engage external threads 92 on the upper end of the sleeve 38". Similarly, the adapter cup 86 has internal threads 94 which engage external threads 96 on the tube. The intermediate extension tube fits around the uppermost ring 40 and a resilient grommet 98 which is disposed coaxially on control lever 8 above the ring 40. A washer 74 is situated between uppermost ring 40 and grommet 98 and these three elements are held in position by an inwardly extending lip 100 of tube 88. Within cup 86, a larger diameter resilient grommet 102 is disposed coaxially on lever 8 and a nut 76 and additional washer 74 serve to secure the upper grommet in place.

The third embodiment of the invention shown in FIG. 5 situates the knob 48 in metal-to-metal communication with the sleeve 38" through the adpater cup 86 and the extension tube 88. This provides a somewhat firmer control or kinesthetic "feel" to the operator, while still providing vibration inhibiting elements between the control lever 8 and exposed external surfaces of the assembly.

While the invention has been described and shown with particular reference to certain preferred embodiments, it will be apparent that other variations are possible within the scope of the invention, which is not intended to be limited except as defined in the following claims.

What is claimed is:

1. A noise-suppressing lever assembly for manually controlling a vibration prone mechanism, said lever assembly having an operator manipulated end and an opposite end extending through an opening in a housing containing said mechanism comprising:

a pivotable control lever having a first end extending into said housing through said opening and being coupled to said mechanism therein, a rigid knob grippable by an operator and coupled to the second end of said lever through vibration dampening means, an elongated sleeve encircling said control lever in radially spaced relation thereto and enclosing substantially the entire length of said lever between said housing and said knob, annular resilient mounting means disposed coaxially between said elongated sleeve and said control lever for supporting said sleeve thereon while inhibiting transmission of vibration from said control lever to said sleeve, and a flexible boot extending between said sleeve and said housing at said opening to inhibit transmission of airborne noise therethrough.

2. The noise-suppressing lever assembly of claim 1 wherein said elongated sleeve is formed of rigid material which is denser than the material of said sleeve mounting means.

3. The noise-suppressing lever assembly of claim 1 wherein said resilient mounting means comprises a plurality of axially spaced apart elastomeric ring members.

4. The noise-suppressing lever assembly of claim 1, wherein said knob is attached to said elongated sleeve through a resilient mount for further inhibiting transmission of vibration to said control knob.

5. The noise-suppressing lever assembly of claim 4 wherein said resilient mount is secured to said sleeve independently of said control lever.

6. The noise-suppressing lever assembly of claim 1 wherein said knob is secured to said sleeve by rigid means.

7. The noise-suppressing lever assembly of claim 1 further comprising a ring formed of acoustically absorbant material extending between said lever and said opening in spaced relation from said boot.

* * * * *